United States Patent
Meylan et al.

(10) Patent No.: US 10,813,115 B2
(45) Date of Patent: Oct. 20, 2020

(54) SCHEDULING OF UPLINK TRANSPORT BLOCKS

(71) Applicant: QUALCOMM Incorporated, San Diego, CA (US)

(72) Inventors: Arnaud Meylan, San Diego, CA (US); Yue Yang, San Diego, CA (US); Mathias Kohlenz, San Diego, CA (US); Sitaramanjaneyulu Kanamarlapudi, San Diego, CA (US); Vishal Dalmiya, San Diego, CA (US); Srinivasan Balasubramanian, San Diego, CA (US); Shailesh Maheshwari, San Diego, CA (US); Gavin Bernard Horn, La Jolla, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/844,325

(22) Filed: Dec. 15, 2017

(65) Prior Publication Data
US 2019/0191448 A1   Jun. 20, 2019

(51) Int. Cl.
*H04W 72/12* (2009.01)
*H04L 1/00* (2006.01)
*H04L 5/00* (2006.01)

(52) U.S. Cl.
CPC ....... *H04W 72/1268* (2013.01); *H04L 1/0008* (2013.01); *H04L 5/0044* (2013.01); *H04W 72/1242* (2013.01)

(58) Field of Classification Search
CPC . H04W 72/1268; H04L 5/0044; H04L 1/0008
See application file for complete search history.

(56) References Cited

U.S. PATENT DOCUMENTS

| | | | |
|---|---|---|---|
| 6,611,515 B1* | 8/2003 | Balachandran | H04L 29/06 370/229 |
| 2006/0002416 A1* | 1/2006 | Yagihashi | H04L 1/1835 370/428 |
| 2009/0129406 A1* | 5/2009 | Hwang | H04L 1/16 370/469 |
| 2010/0232356 A1* | 9/2010 | Maheshwari | H04L 1/1867 370/328 |

(Continued)

FOREIGN PATENT DOCUMENTS

WO    2017196968 A1    11/2017

OTHER PUBLICATIONS

International Search Report and Written Opinion—PCT/US2018/065721—ISA/EPO—Feb. 26, 2019.

*Primary Examiner* — Un C Cho
*Assistant Examiner* — Yu-Wen Chang
(74) *Attorney, Agent, or Firm* — Patterson & Sheridan, L.L.P.

(57) ABSTRACT

Certain aspects of the present disclosure relate to wireless communications, and more particularly, to techniques for preparing data for transmission from a user equipment in a wireless communication system. In some embodiments, a method may limit memory access starts during a time interval to ensure that all memory access operations are completed with a transmission time interval.

40 Claims, 11 Drawing Sheets

(56) References Cited

U.S. PATENT DOCUMENTS

| | | | |
|---|---|---|---|
| 2012/0155438 A1* | 6/2012 | Shin | H04W 28/065 370/336 |
| 2016/0026479 A1* | 1/2016 | Rosenzweig | G06F 9/44505 710/104 |
| 2016/0150531 A1* | 5/2016 | Johansson | H04W 72/0446 455/452.1 |
| 2016/0302105 A1* | 10/2016 | Damnjanovic | H04W 28/065 |
| 2017/0311317 A1 | 10/2017 | Dinan et al. | |
| 2018/0324779 A1* | 11/2018 | Li | H04W 72/044 |
| 2019/0174492 A1* | 6/2019 | Gao | H04W 72/02 |

\* cited by examiner

SCHEDULING OF UPLINK TRANSPORT BLOCKS

INTRODUCTION

Aspects of the present disclosure relate to wireless communications, and more particularly, to techniques for preparing data for transmission from a user equipment in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations, each simultaneously supporting communication for multiple communication devices, otherwise known as user equipments (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL), as well as supporting beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between participants in a wireless network.

Certain aspects provide a method for wireless communication. In a first aspect, a method of preparing data for transmission from a user equipment, includes: initializing a counter at the beginning of a first packet processing time interval of a transmit time interval; determining a plurality of data blocks to be transmitted during the transmit time interval; for each respective data block in the plurality of data blocks: comparing a value of the counter to a threshold value; if the value of the counter is less than or equal to the threshold value: mapping the respective data block to a location in one of a plurality of transport blocks; and incrementing the value of the counter if a packet processing event will occur during the first packet processing time interval of the transmit time interval; and if the value of the counter is greater than the threshold value: mapping the respective data block to a location in one of the plurality of transport blocks such that a packet processing event associated with the respective data block will not occur until a second packet processing time interval of the transmit time interval. In another aspect, an user equipment is configured to perform the method of preparing data for transmission from a user equipment described herein. In yet another aspect, a computer-readable medium includes computer-executable instructions that, when executed by a processor of a user equipment, cause the user equipment to perform the method of preparing data for transmission from a user equipment described herein.

To the accomplishment of the foregoing and related ends, the one or more aspects comprise the features hereinafter fully described and particularly pointed out in the claims. The following description and the related drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
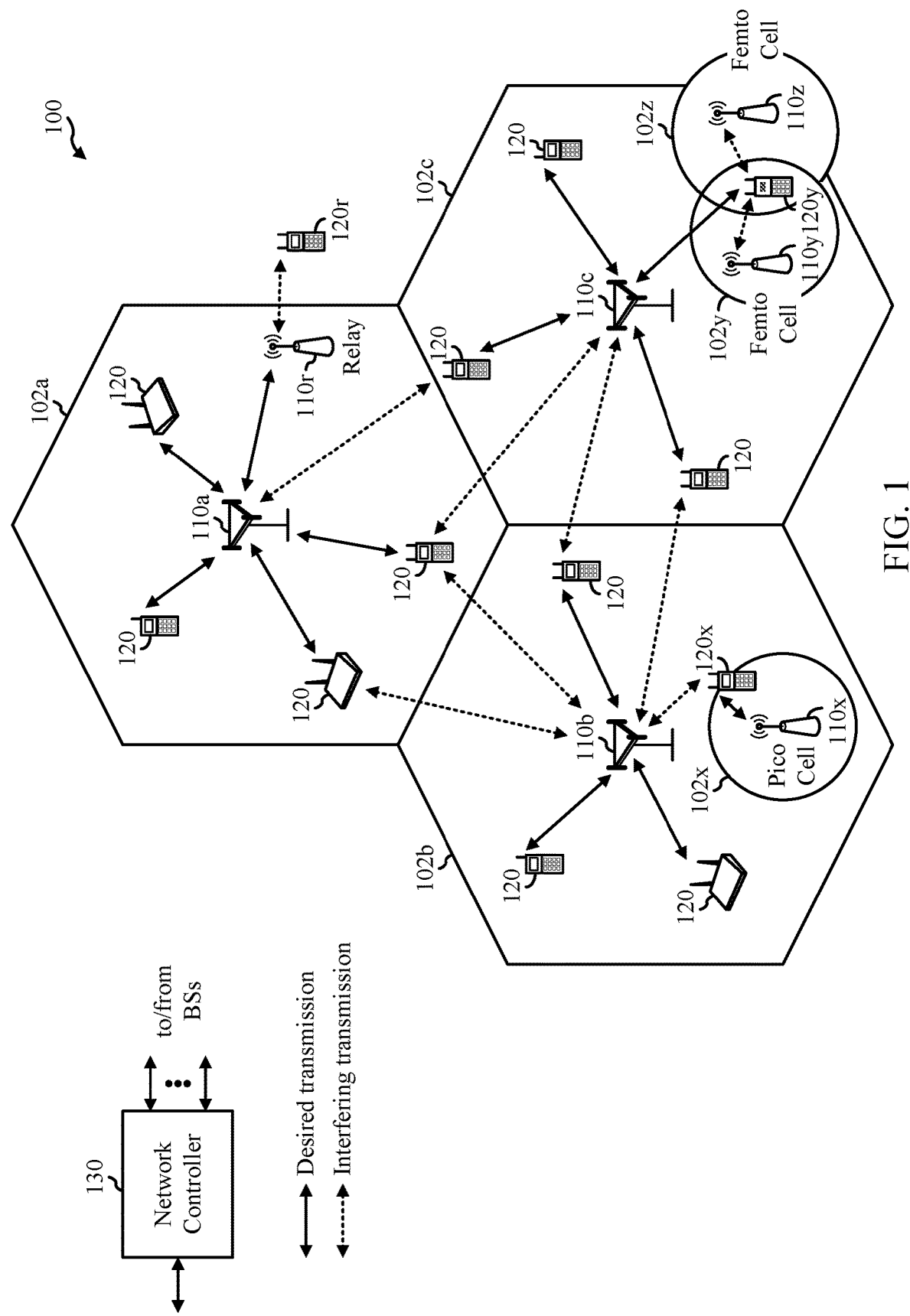
FIG. 1 is a block diagram conceptually illustrating an example telecommunications system, in accordance with certain aspects of the present disclosure.

Aspects of the present disclosure provide apparatus, methods, processing systems, and computer readable mediums for techniques for preparing data for transmission from a user equipment in a wireless communication system.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New Radio (NR) may support various wireless communication services, such as: Enhanced Mobile Broadband (eMBB) targeting wide bandwidth (e.g. 80 MHz and beyond), millimeter wave (mmW) targeting high carrier frequency (e.g. 27 GHz and beyond), massive machine-type communication (mMTC) targeting non-backward compatible machine-type communication (MTC) techniques, and/or mission critical services targeting ultra-reliable low latency communications (URLLC). These services may include latency and reliability requirements. These services may also have different transmission time intervals (TTIs) to meet respective quality of service (QoS) requirements. In addition, these services may coexist in the same subframe. In LTE, the basic transmission time interval (TTI) or packet duration is 1 subframe of 1 ms, and a subframe may be further divided into two slots of 0.5 ms each. In NR, a subframe may still be 1 ms, but the basic TTI may be referred to as a slot. Further, in NR, a subframe may contain a variable number of slots (e.g., 1, 2, 4, 8, 16, . . . slots) depending on the tone spacing (e.g., 15, 30, 60, 120, 240, . . . kHz).

Example Wireless Communications System

FIG. 1 depicts an example wireless communication network 100 in which aspects of the present disclosure may be performed. For example, the wireless network may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in the wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame of 10 ms may consist of 2 half-frames of 5 ms, and each half-frame may consist of 5 subframes of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs). In such examples, other UEs may utilize resources scheduled by the UE for wireless communication. In some examples, a UE may function as a scheduling entity in a peer-to-peer (P2P) network, and/or in a mesh network. In a mesh network example, UEs may optionally communicate directly with one another in addition to communicating with a scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a Radio Access Network (RAN) may include a Central Unit (CU) and Distributed Units (DUs). A NR BS (e.g., gNB, 5G Node B, Node B, transmission reception point (TRP), access point (AP)) may correspond to one or multiple BSs. NR cells can be configured as access cell (ACells) or as data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit synchronization signals (SS). NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
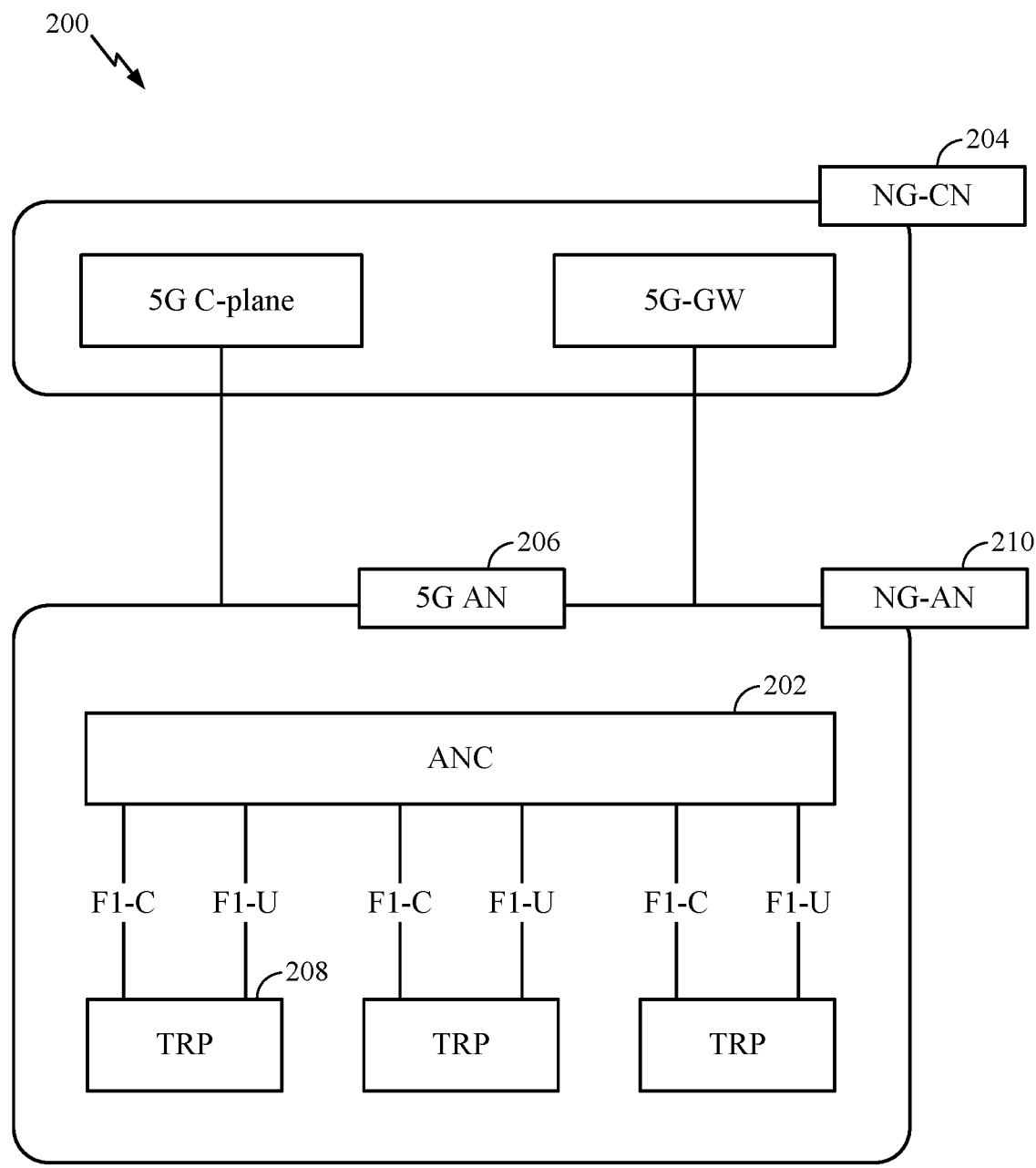
FIG. 2 is a block diagram illustrating an example logical architecture of a distributed RAN, in accordance with certain aspects of the present disclosure.

FIG. 2 depicts an example logical architecture of a distributed Radio Access Network (RAN) 200, which may be implemented in the wireless communication system illustrated in FIG. 1. A 5G access node 206 may include an Access Node Controller (ANC) 202. The ANC may be a Central Unit (CU) of the distributed RAN 200. The backhaul interface to the Next Generation Core Network (NG-CN) 204 may terminate at the ANC. The backhaul interface to Neighboring Next Generation Access Nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A Transmission Reception Point (TRP) may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The Next Generation Access Node (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
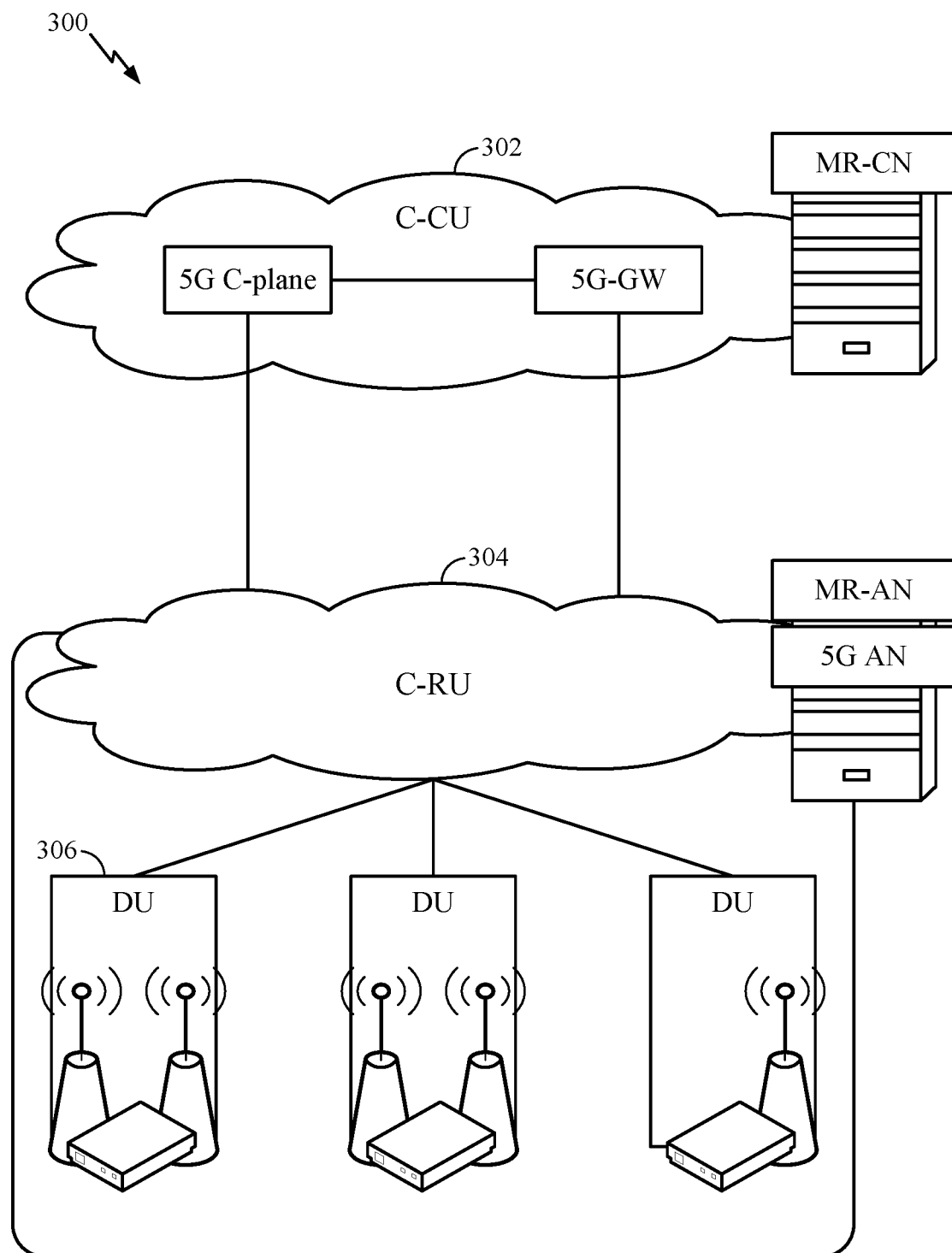
FIG. 3 is a diagram illustrating an example physical architecture of a distributed RAN, in accordance with certain aspects of the present disclosure.

FIG. 3 depicts an example physical architecture 300 of a distributed Radio Access Network (RAN), according to aspects of the present disclosure. A Centralized Core Network Unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
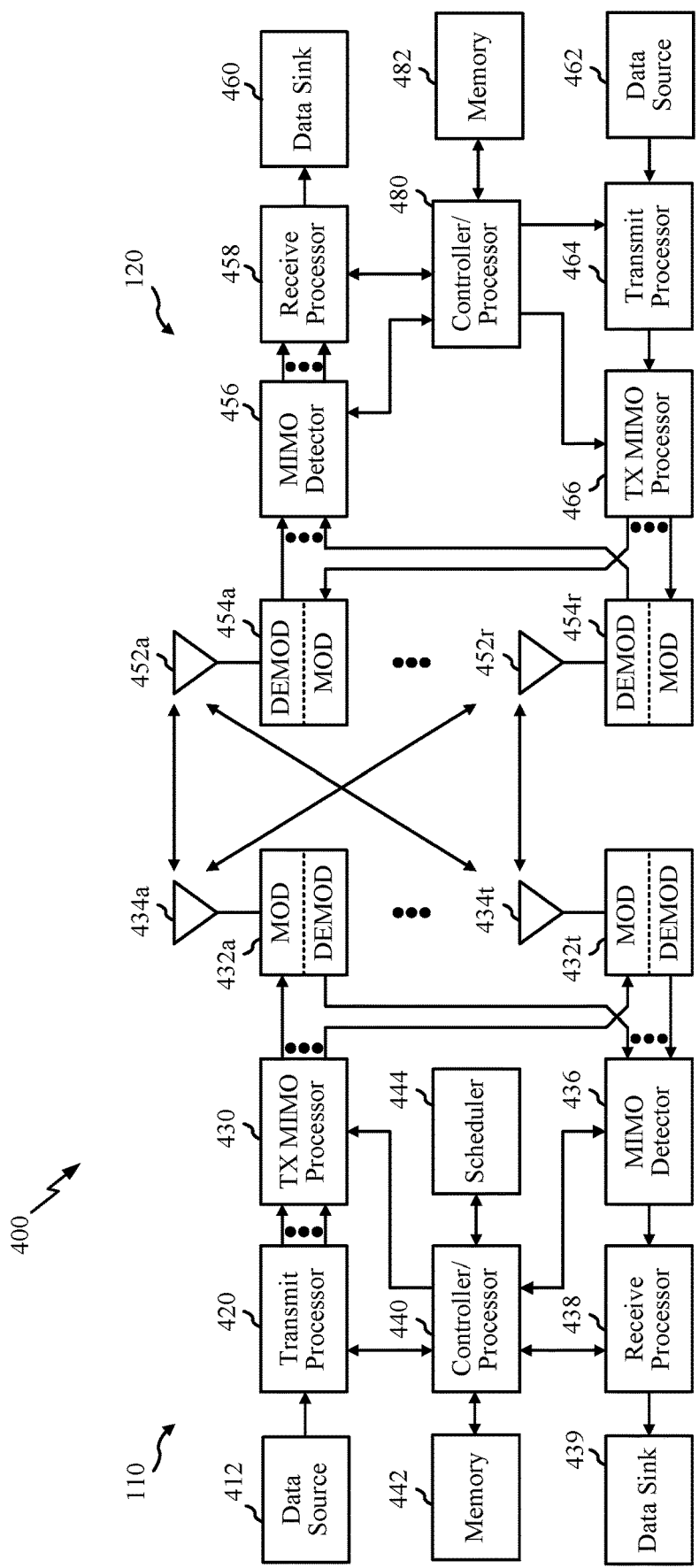
FIG. 4 is a block diagram conceptually illustrating a design of an example base station (BS) and user equipment (UE), in accordance with certain aspects of the present disclosure.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r. The BS may include a TRP and may be referred to as a Master eNB (MeNB) (e.g., Master BS or Primary BS). The Master BS and the Secondary BS may be geographically co-located.

One or more components of the BS 110 and UE 120 may be used to practice aspects of the present disclosure. For example, antennas 452, transceivers 454, detector 456, processors 466, 458, 464, and/or controller/processor 480 of the UE 120 and/or antennas 434, transceivers 432, detector 436, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the Primary Synchronization Signal (PSS), Secondary Synchronization Signal (SSS), and Cell-Specific Reference Signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) within transceivers 432a through 432t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from transceivers 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from the demodulators in transceivers 454a through 454r, perform MIMO detection on the received symbols if applicable, and provide detected symbols. A receive processor 458 may process (e.g., deinterleave and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the transceivers 432a through 432t, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for the BS 110 and the UE 120, respectively. A scheduler 444 may schedule UEs for data transmission on the downlink and/or uplink.

Figure 5:
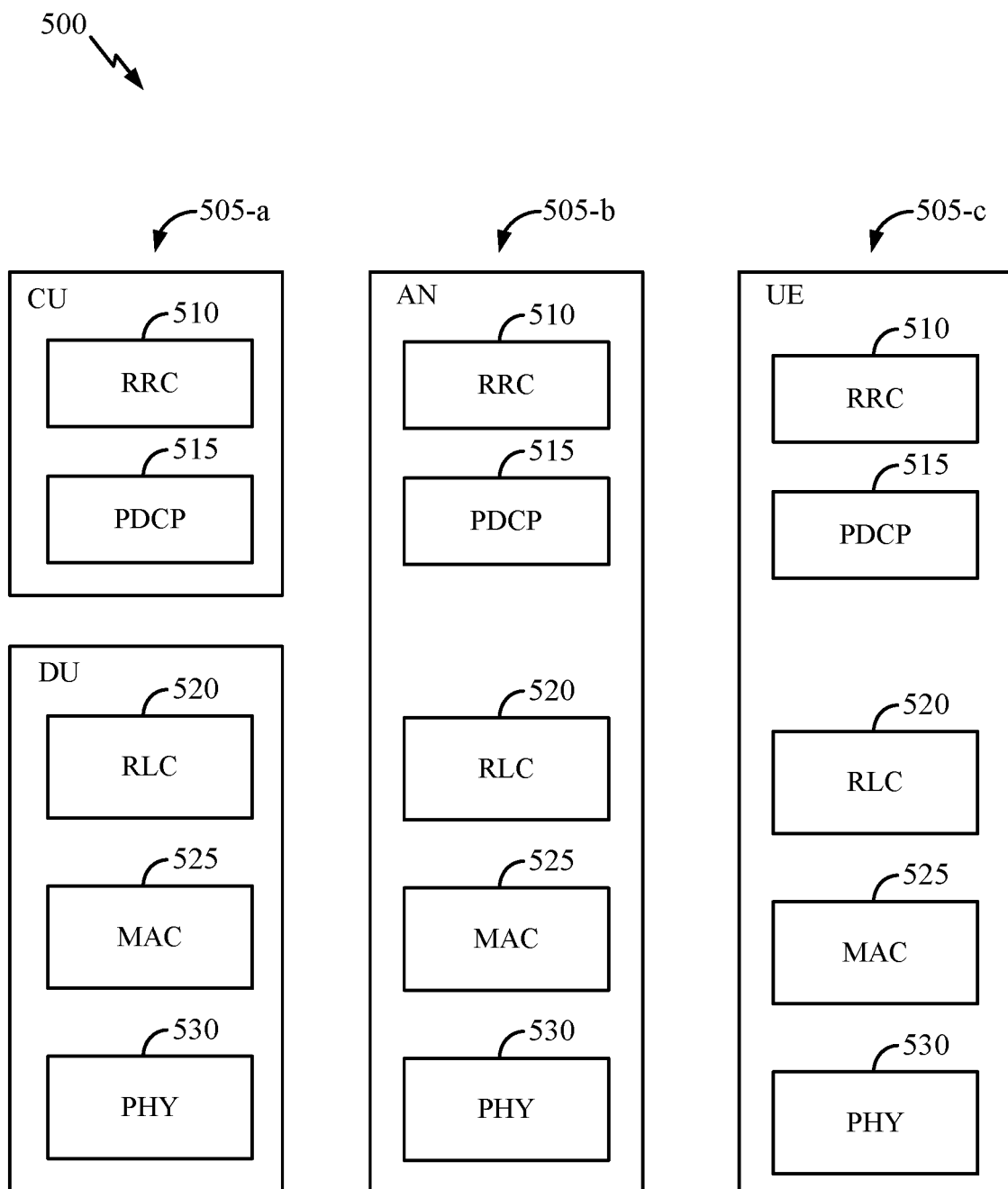
FIG. 5 is a diagram showing examples for implementing a communication protocol stack, in accordance with certain aspects of the present disclosure.

FIG. 5 depicts a diagram 500 showing examples for implementing a communications protocol stack, according to aspects of the present disclosure. The illustrated communications protocol stacks may be implemented by devices operating in a wireless communication system, such as a 5G system. Diagram 500 includes a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., an access node (AN), a new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Figure 6:
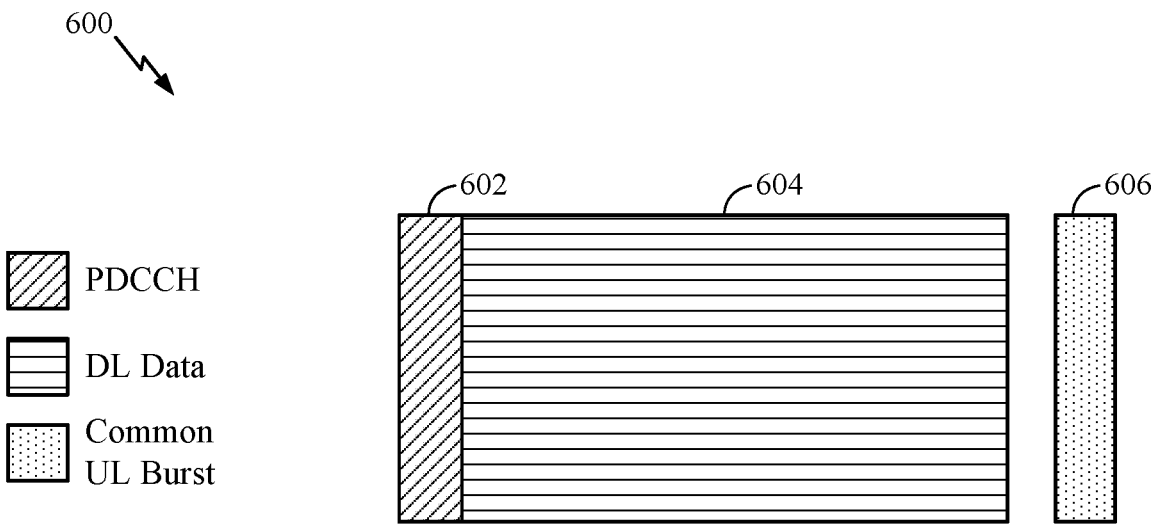
FIG. 6 depicts an example of a DL-centric subframe, in accordance with certain aspects of the present disclosure.

FIG. 6 is a diagram showing an example of a DL-centric subframe 600, such as may be used with a RAT like NR. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
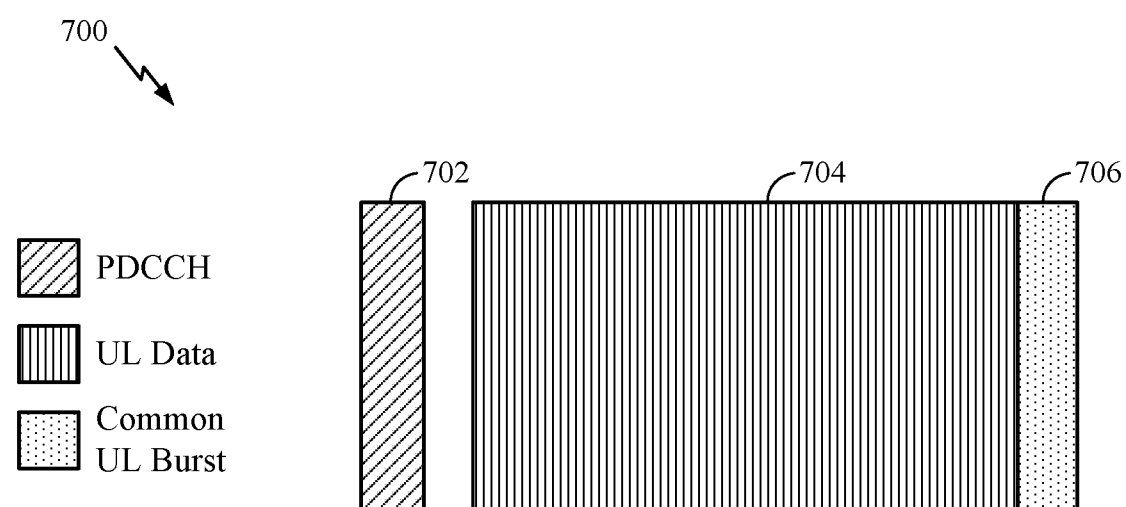
FIG. 7 depicts an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Method for Improved Scheduling of
Uplink Transport Blocks

As discussed above, with respect to FIG. 5, data to be transmitted from a user equipment, such as application data created in the user plane, may be formatted through several conceptual layers, including the Packet Data Convergence Protocol (PDCP) layer, Radio Link Control (RLC) layer, Medium Access Control (MAC) layer, and the Physical (PHY) layer before being transmitted on the air interface (e.g., NR, 5G, LTE, 4G, and the like).

Generally speaking, for the transmission path, the PDCP layer receives IP packets from the user plane (e.g., from an application on the user equipment) as service data units (SDUs) and prepares PDCP protocol data units (PDUs) for the RLC layer. The RLC layer receives the PDCP PDUs as RLC SDUs, appends additional header data to form RLC PDUs, and passes the RLC PDUs to the MAC layer on logical channels. There are many different logical channels assigned for different data types (e.g., user plane versus control plane) and different data directions (e.g., uplink versus downlink). Examples of logical channels include the dedicated traffic channel (DTCH), dedicated control channel (DCCH), common control channel (CCCH), paging control channel (PCCH), broadcast control channel (BCCH), multicast control channel (MCCH), and multicast traffic channel (MTCH). The MAC layer receives the RLC PDUs as MAC SDUs then adds additional header data and padding to form MAC PDUs. The MAC layer then sends the MAC PDUs to the PHY layer on transport channels in the form of transport blocks, which are the length of the TTI, but may include variable amount of data based on factors such as modulation, coding, number of sub-carriers allocated, etc. Like logical channels, there are different transport channels for different types of data and data directions. Example transport channels include the uplink shared channel (UL-SCH), random access channel (RACH), downlink shared channel (DL-SCH), paging channel (PCH), broadcast channel (BCH), and multicast channel (MCH). Generally speaking, the MAC layer schedules all transmissions on the air interface and controls certain operations of the physical interface. Thereafter, the PHY layer transmits data on different physical data channels, such as the physical uplink shared channel (PUSCH), physical random access channel (RACH), physical downlink shared channel (PDSCH), physical broadcast channel (PBCH), and physical multicast channel (PMCH).

When preparing data to be transmitted, the user equipment may implement a logical channel prioritization function, which determines how much data the user equipment should transmit from each incoming logical channel (i.e., between the RLC layer and the MAC layer) in every transmission time interval (TTI). The incoming logical channels may have logical channel IDs and in some examples, a fixed number of logical channels may be implemented by a specification. A packet mapping function of the user equipment may use the resulting prioritization in order to map data in a memory (e.g., memory 1110 in FIG. 11, described further below) to one or more transport blocks for transmission in an upcoming transmission time interval. Once the packet mapping function has mapped the data to the transport blocks, the user equipment may fetch the data from the memory (e.g., from a transmit buffer) and prepare it for transmission on the physical data channels.

An issue may arise when data from many logical channels are mapped to a particular transmission time interval. Because each data retrieval (i.e., fetch) takes a certain period of time to complete, it is possible that data being fetched from a memory for a particular transport block toward the end of a transmission time interval does not arrive in time before the transport blocks are sent to the physical layer for transmission. The missing data in such instances may corrupt the transport block and require the whole transmit block to be retransmitted, which leads to inefficient use of the air interface.

Figure 8A:
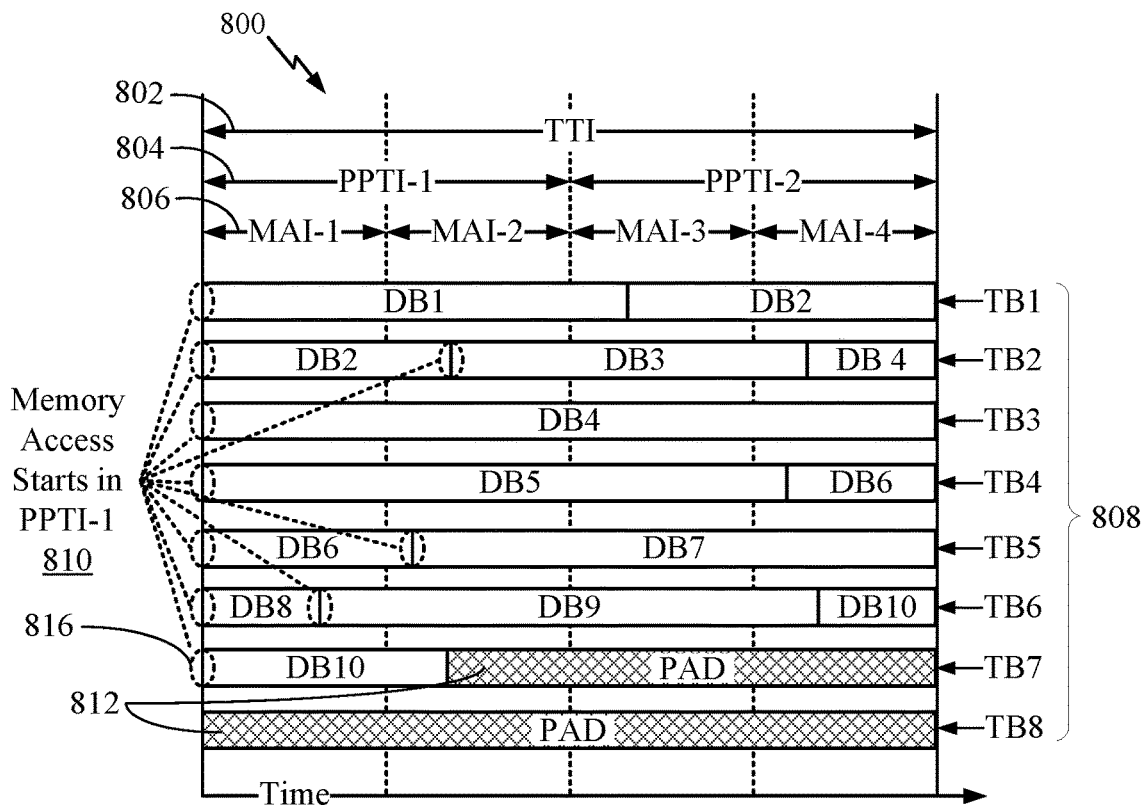
FIGS. 8A and 8B depict aspects of a method of preparing data for transmission from a user equipment in a wireless communication system.

FIG. 8A depicts aspects of a method for preparing data for transmission from a user equipment in a wireless communication system. In particular, FIG. 8A depicts aspects of a method for limiting memory access starts during a time interval to ensure that all memory access operations are completed timely for a transmission time interval.

As shown in FIG. 8A, a transmission time interval, such as TTI 802, may be subdivided into a number of memory packet processing time intervals (PPTI) 804 and/or memory access intervals (MAI) 806. In the example shown in FIG. 8A, the memory access interval 806 is the shortest interval for consideration. The memory access interval 806 may correspond to an amount of time necessary to fetch data from a memory in the user equipment, such as a main or primary memory. For example, the memory access interval 806 may correspond to a time to complete a direct memory access (DMA) operation using a DDR memory in the user equipment. In some examples, the memory access interval 806 may correspond to a worst-case time interval, such as the longest time it could possibly take to fetch data from the memory. In other cases, the memory access interval 806 may correspond to an average case time interval, such as the average time it takes to fetch data from the memory. In yet other cases, the memory access interval 806 may correspond to a best case time interval, such as the shortest time it could possibly take to fetch data from the memory. Other examples are possible. In some embodiments, the memory access interval is approximately 35 microseconds. In other embodiments, the memory access interval is in a range of 25-50 microseconds.

The packet processing time interval 804 in FIG. 8A is based on a multiple of the memory access interval 806. In this case, a single packet processing interval 804 corresponds to two memory access intervals 806. In other cases, the packet processing interval 804 could be equal to fewer units of the memory access interval 806, such as a single memory access interval, or to more units of the memory access interval 806, such as three or more. In yet other cases, the packet processing interval 804 may be a fractional multiple of the memory access interval 806, such as one and one-half units. Further, the packet processing interval 804 may be dynamic based on operating conditions of the user equipment, such as the amount of memory in use, the fragmentation of the memory, the priority of the data transmission, the TTI duration in use, etc.

A function of the user equipment, such as a packet mapping function, may use the packet processing time interval 804 as reference to limit the number of memory accesses planned in a given period of time. For example, the packet mapping function may limit the number of memory access "starts" within a packet processing time interval 804 to a particular value (e.g., a "maximum starts" or "max starts" value) in order to avoid the possibility of having too many memory accesses in a particular packet processing time interval. It may be desirable to limit the number of memory access starts during a packet processing time interval 804 in order to avoid a memory access operation "running late" and failing to deliver the data to construct transport block on time, according to the timing requirement of the air interface.

For example, FIG. 8A depicts the layout of a plurality of data blocks (DB1-10) in a plurality of transport blocks (TB1-8) 808 within a single transport time interval 802. In this example, the maximum starts threshold value is set at ten i.e., the maximum number of new memory accesses (e.g., DMA operations) the packet mapping function will allow during the packet processing time interval 804 is ten. The maximum starts value may be set, for example, arbitrarily or, as another example, as a function of one or more of: the memory access time interval length, packet processing time interval length, and transmission time interval length.

As depicted in FIG. 8A, there are ten memory access starts 810 within the first packet processing time interval 804 (PPTI-1) of transmission time interval 802. Here, the ten memory accesses starts are associated with data blocks (DB1-10), which may correspond to the logical channels selected for transmission according to the logical channel prioritization scheme, discussed above. The maximum number of starts is reached at 816 within PPTI-1 and with respect to data block 10 (DB10) in transport block 7 (TB7). Notably, in this example, the packet processing function discontinues memory accesses after the maximum number of memory access starts is reached in either packet processing time interval 804 (i.e., in PPTI-1 or PPTI-2). Thus, limiting the number of memory access starts in a given packet processing time interval 804 may prevent a memory access operation from beginning too late to finish by the end of the transmit time interval 802, which beneficially avoids the possibility of corrupting the data transmission associated with transmission time interval 802.

A consequence of limiting the number of memory access starts in a given packet processing time interval, however, is that the user equipment will no longer fetch new data once the maximum number of memory access starts is reached, even if there is space left in resource block 800 (e.g., in part of transport block 7 and all of transport block 8 in this example). Instead, according to one option the user equipment may include padding bits in the rest of the available transport block space in the transmission time interval 802. For example, in FIG. 8A, padding 812 is inserted into part of transport block 7 and all of transport block 8. Notably, parts of transport block 7 are padded even though the maximum number of memory access starts in the second packet processing time interval 804 (PPTI-2) is not reached (here, there are only four memory access starts in PPTI-2). This may be due to the radio access technology requiring that once padding inside a transport block begins, it cannot end until the end of the transport block. Thus, while limiting the number of memory access starts in a given time period, such as the packet processing time interval 804, may protect against the possibility of not meeting the packet building timeline in the transmission time interval 802, it may also result in inefficient use of resource block 800 since padding will be transmitted on the air interface.

Figure 8B:
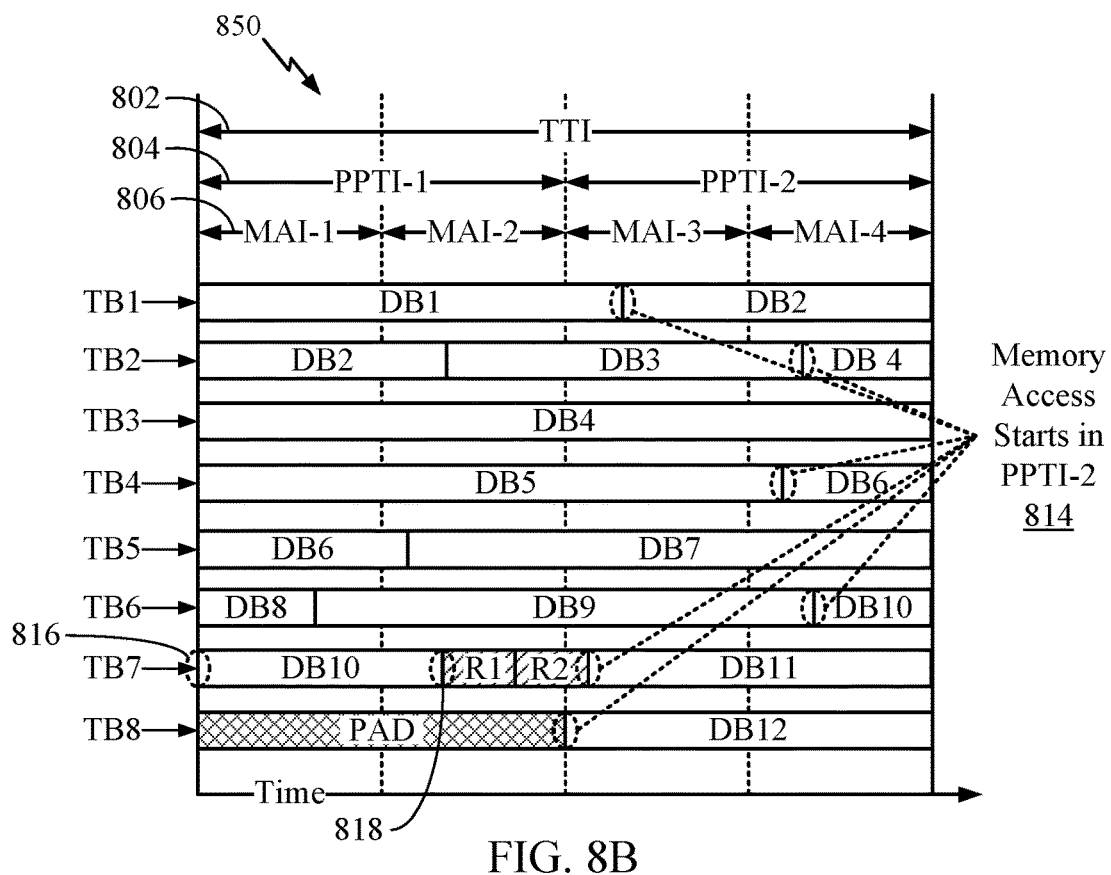

FIG. 8B depicts further enhancements to the packet planning process depicted in FIG. 8A. In FIG. 8B, the first ten data blocks (DB1-10) are scheduled the same way as in FIG. 8A. However, in FIG. 8B, upon reaching maximum starts at 816, the packet mapping function of the user equipment will discontinue additional memory access operations during PPTI-1 and, instead, begin repeating or duplicating data from the previous data blocks DB1-10 at time 818. Data blocks R1 and R2 may include data from any of the previous data blocks DB1-10, such as a portion of one or more of data blocks DB1-10, or a whole data block, etc. Note that in this example there are two blocks of repeated data (R1 and R2), but in other examples there could be any number of blocks of repeated data depending on the type of data chosen to be repeated (e.g., by the packet mapping function of the user equipment).

The data repeated in blocks R1 and R2 may comprise elements of payload associated with a data radio bearer (DRB) or a Signaling Radio Bearer (SRB) packet data convergence protocol service data unit (PDCP SDU), such as: a radio link control status protocol data unit (RLC status PDU); or an RLC control PDU; or a medium access control (MAC) control PDU, or a MAC status PDU, or a PDCP control PDU; or a PDCP status PDU; or other elements. For example, RLC control PDUs, such as the status PDU, may be repeated in one or more of blocks R1 and R2.

There are several considerations in deciding what to repeat (i.e., duplicate) in blocks R1 and R2. For example, repeating data within a code block may not be as useful because the first version is generally received at the same time as the duplicate version. However, repeating data across code blocks or transport blocks may provide diversity and therefore may expedite delivery of the data. For example, repeating copies of low latency data, such as data using RLC unacknowledged mode, across different code blocks may provide diversity, which is especially useful for low latency services. As another example, repeating TCP acknowledgement data (e.g., ACKs) can create issues because the TCP sender may respond to several (e.g., three or more) duplicate ACKs with a fast retransmit procedure, which may reduce throughput on the air interface. One potential method of mitigating this issue is that the user equipment can avoid duplicating packets smaller than 100 bytes (such as ACKs) on the internet default bearer. As yet another example, duplicating RRC measurement reports in different code blocks could lower the latency for delivering the reports, and therefore could beneficially accelerate handover and reduce outage.

Another consideration with respect to the strategy of repeating data in blocks R1 and R2 is that the data to be repeated must be stored somewhere other than the main memory that is accessed in the first instance (because otherwise it would require additional memory access starts). Thus, a secondary memory, such as an on-chip memory, may be added to the user equipment to cache data fetched from the primary memory. In this way, data may be cached for repetition without the need for another memory access operation, such as a DMA operation.

FIG. 8B depicts another packet mapping enhancement as compared to FIG. 8A. In particular, instead of padding the rest of the transmission time interval 802 after reaching the maximum number of memory access starts in either of the packet processing time intervals 804 within transmission time interval 802 (in FIG. 8A, max starts is reached at 816 in PPTI-1), in FIG. 8B the two packet processing time intervals are treated independently. Consequently, even if the maximum number of memory access starts is reached in PPTI-1 (as at 816), the packet mapping function of the user equipment may schedule new memory access operations in PPTI-2 if the number of memory access starts in PPTI-2 is below the memory access starts threshold. Accordingly, in FIG. 8B, a new memory access is started in the second packet processing time interval (PPTI-2) to add data block 11 (DB11) to transport block 7 (TB7) despite the maximum number of memory access starts being reached in the first packet processing time interval PPTI-1 in transport block 7 (TB7) at 816. Similarly, a new memory access is initiated in the second packet processing time interval (PPTI-2) to add data block 12 (DB12) to transport block 8 (TB8) because the total number of memory access starts 814 in PPTI-2 remains below the threshold of ten. Thus, by applying the maximum memory access start strategy to packet processing time intervals 804 individually, more data is added to resource block 850 in transmission time interval 802, which results in more efficient use of the air interface.

In the example depicted in FIG. 8B, transport block 8 (TB8) is padded in PPTI-1 due to reaching max starts at 816. In some embodiments, the secondary memory used to cache data fetched from the primary memory may be small in order to, for example, keep cost and chip size down. Thus, the blocks of repeated data R1 and R2 may be sufficient to duplicate the data capable of being stored in the secondary memory. However, in other embodiments, this padding may be replaced with additional repeated data from data blocks (e.g., DB1-10). This could be accomplished by, for example, increasing the secondary memory size, or by repeating data more than once. For example, data selected for repetition may be repeated two, three, or more times.

When treating the packet processing time intervals independently for purpose of padding, it may be beneficial to specify the length of the padding, for example, via a MAC header. That is, a variable length of padding may be indicated via a MAC header that may include a padding length indication together with a padding identifier. In this way, it is possible to pad specific portions of a transport block and resume mapping data from data blocks after padding the specific portion, but before the end of the transport block, such as shown in TB8 in FIG. 8B. Notably, while the padding in TB8 is shown in FIG. 8 as the entire length of packet processing time interval PPTI-1, in other examples it may be only a portion of a packet processing time interval. The ability to define a length of the padding, for example in a MAC header, means that the padding of transport blocks may be enhanced significantly as compared to a strategy of padding to the end of a transport block whenever padding of that transport block is begun.

Another packet mapping enhancement is to replace standard padding, which may be a string of random bits or unitary bits (e.g., all zeros or ones), with actual data bits so that the portions of a transport block that are planned to carry padding are actually carrying data. For example, the paddings in transport block TB8 during packet processing time interval PPTI-1 may include data from a logical channel that is not configured for the data transmission session, i.e., an invalid logical channel. For example, the padding in transport block TB8 could be replaced with data from a logical channel that is allowed by a specification (e.g., 3GPP), but is not currently configured by a radio resource controller (RRC). As another example, the padding in transport block TB8 could be replaced with data from a logical channel that is reserved, i.e., not intended to be used during the transmission session. In some examples, the content of the data from the logical channel that is not configured or is otherwise reserved may include data such as those repeated in blocks R1 and R2, as described above. While the receiver (e.g., an eNodeB or gNodeB) may normally be expected to discard such data, the receiver may be modified to receive and process such data. In this way, the typical padding that conveys no information may be replaced with padding including useful information. Notably, this enhancement is complimentary to those described above because some padding may exist even after implementing the methods described above.

Notably, while the packet processing time intervals described with respect to FIGS. 8A and 8B are used to monitor memory access starts, the packet processing time intervals may be used as a reference for measuring any metric that relates to the preparation of data for transmission, including memory access time, payload ciphering time, etc.

Figure 9:
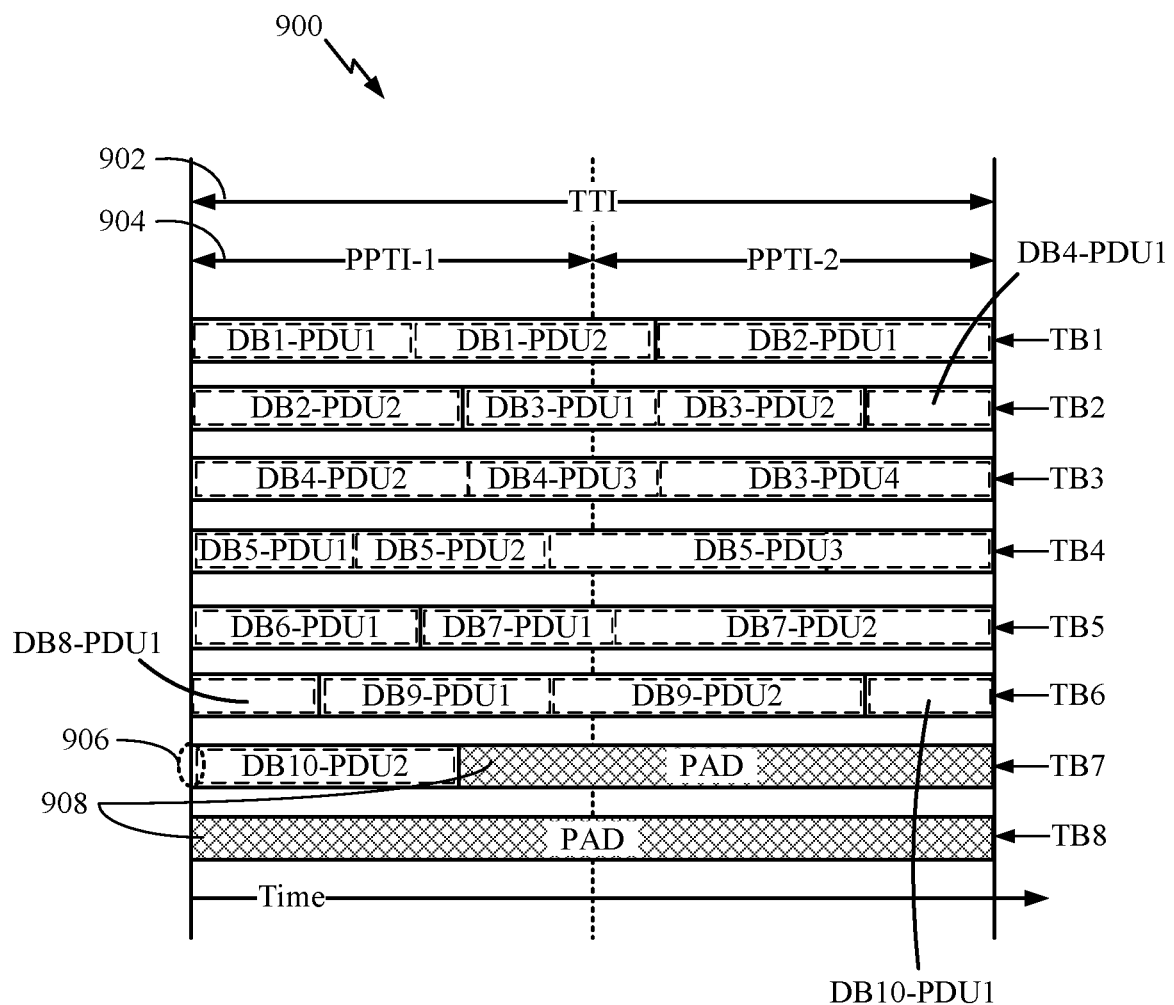
FIG. 9 depicts aspects of a method of preparing data for transmission from a user equipment in a wireless communication system.

For example, in FIG. 9 the packet processing time intervals 904 are used as a reference for how many protocol data units, e.g. PDCP PDUs, are scheduled for transmission during a particular interval (e.g., PPTI-1 or PPTI-2). In some embodiments, an appropriate threshold value (e.g., "maximum PDUs") may be set for the number of PDCP PDUs scheduled within a packet processing time interval, such as PPTI-1 and PPTI-2. Such a threshold may help to limit, for example, the number of ciphering operations required during the packet processing time interval.

For example, if the maximum number of PDCP PDUs allowed in a packet processing time interval 904 is 15, then a packet mapping function may discontinue adding PDCP PDUs to data blocks after the number of PDCP PDUs reaches 15 in a particular packet processing time interval and may thereafter pad until the end of the transmission time interval 902. As shown in FIG. 9, the number of PDCP PDUs reaches the maximum (15) at 906 and thereafter padding 908 is added to the remainder of transport block 7 (TB7) and transport block 8 (TB8).

The example depicted in FIG. 9 can be further enhanced in the same manner as described with respect to FIG. 8B, above. Thus, the number of PDUs in a given packet processing time interval be considered independently for each packet processing time interval 904 in order that more of the resource block 900 may be utilized for data transmission.

Figure 10:
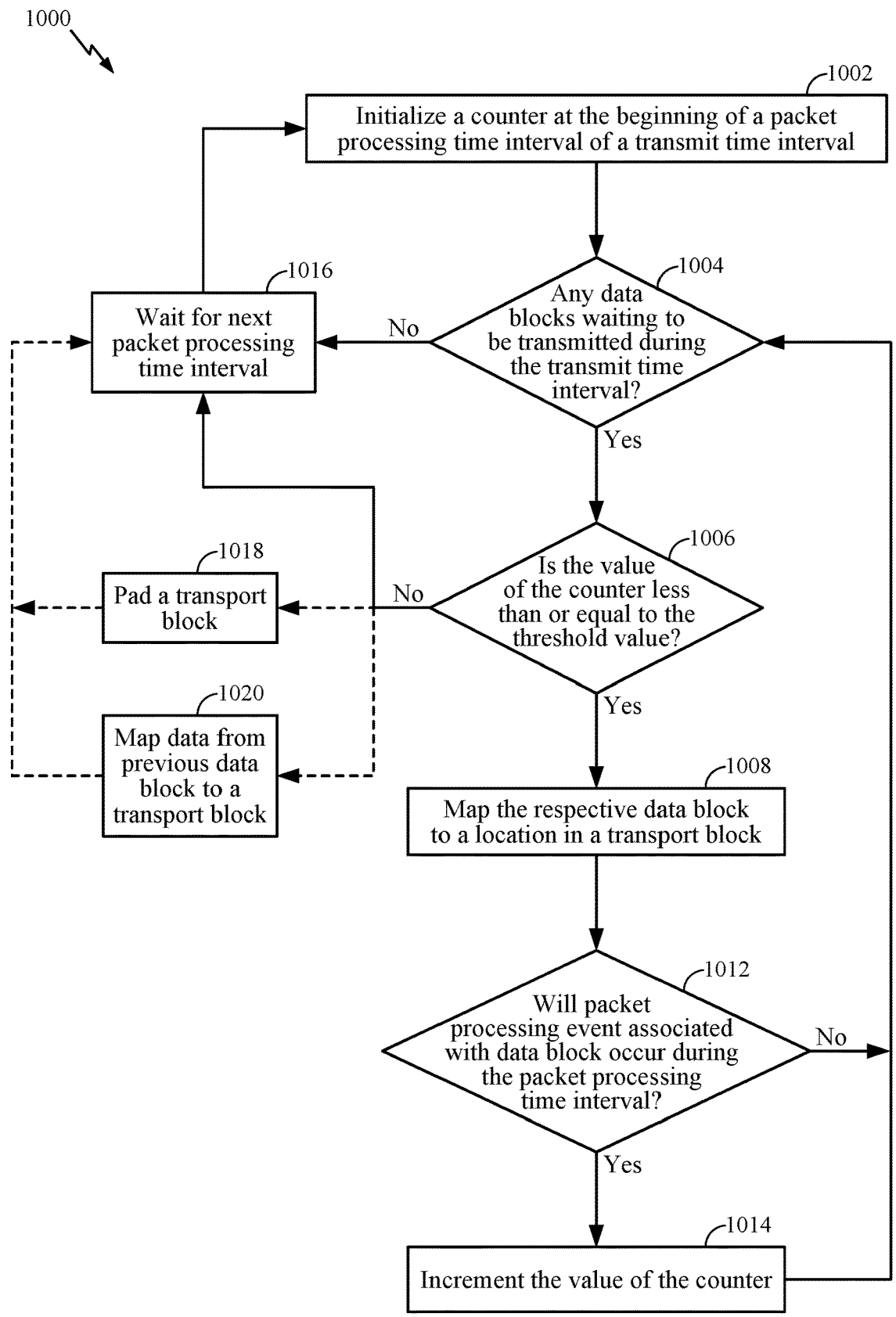
FIG. 10 depicts aspects of a method for preparing data for transmission from a user equipment in a wireless communication system.

FIG. 10 depicts aspects of a method 1000 for preparing data for transmission from a user equipment in a wireless communication system. For example, the method 1000 may be performed by a packet mapping function of a user equipment.

The method begins at step 1002, where a counter is initialized at the beginning of a packet processing time interval of a transmit time interval. For example, the counter may be initialized at the beginning of packet processing time interval PPTI-1 or PPTI-2, as described with reference to FIGS. 8A-8B and 9, above.

The method then moves to step 1004 where a determination is made as to whether any data blocks are waiting to be transmitted during the transmit time interval.

If there are no data blocks waiting to be transmitted during the transmit time interval, then the method moves to step 1016 where the method waits for the next packet processing time interval.

If there are data blocks waiting to be transmitted during the transmit time interval, then the method moves to step 1006 where a value of the counter is compared to a threshold value. For example, the threshold value could be the maximum memory access starts or the maximum PDCP PDUs allowed in a packet processing time interval, as discussed above with respect to FIGS. 8A-8B and 9, respectively.

If the value of the counter is less than or equal to the threshold value at step 1006, then the method moves to step 1008, where the respective data block is mapped to a location in a transport block, such as how data blocks DB1-10 are mapped to transport blocks TB1-8 in FIGS. 8A-8B and 9.

After step 1008, the method moves to step 1012, where it is determined whether the packet processing event associated with the respective data block will occur during the current packet processing time interval. If not, then the method returns to step 1004. If so, then the method moves to step 1014 where the value of the counter is incremented. For example, referring back to FIG. 8A, if the next data block to be mapped to a transport block was DB8 and the current packet processing time interval was PPTI-1, then the counter would be incremented because mapping DB8 to TB6 would require a new memory access operation.

Returning to step 1006, if the value of the counter is greater than the threshold value at step 1006, then the method moves to step 1016 where the method waits for the next packet processing time interval. For example, referring back to FIG. 8B, if the next data block to be mapped to a transport block was DB12 and the current packet processing time interval was PPTI-1, then the method would wait until PPTI-2 to map DB12.

If the value of the counter is greater than the threshold value at step 1006, then the method may also move to optional steps 1018 or 1020. At optional step 1018, the method pads a transport block. For example, referring back to FIG. 8B, if the next data block to be mapped to a transport block was DB12 and the current packet processing time interval was PPTI-1, then the method may pad a portion of a transport block such as TB8 in FIG. 8B. In some examples, the padded portion of the transport block may by specified by a padding length indicator in addition to a padding identifier in a MAC header, as described above with reference to FIG. 8B. Further, in some examples, the padding may include data from a logical channel that is not configured by the RRC or from a logical channel that is normally reserved, as described above with reference to FIG. 8B.

At optional step 1020, the method maps data from a previous data block to a transport block. For example, again referring back to FIG. 8B, if the next data block to be mapped to a transport block was DB11 and the current packet processing time interval was PPTI-1, then the method may map repeated or duplicate data to a transport block, such as in blocks R1 and R2 in TB7 in FIG. 8B. As described above, this data may include, for example, elements of payload associated with a data radio bearer (DRB) or a Signaling Radio Bearer (SRB) packet data convergence protocol service data unit (PDCP SDU), such as: a radio link control status protocol data unit (RLC status PDU); or an RLC control PDU; or a medium access control (MAC) control PDU, or a MAC status PDU, or a PDCP control PDU; or a PDCP status PDU; or other elements.

The steps (and their order) described with respect to method 1000 are just one example of a possible method for preparing data for transmission from a user equipment in a wireless communication system.

Figure 11:
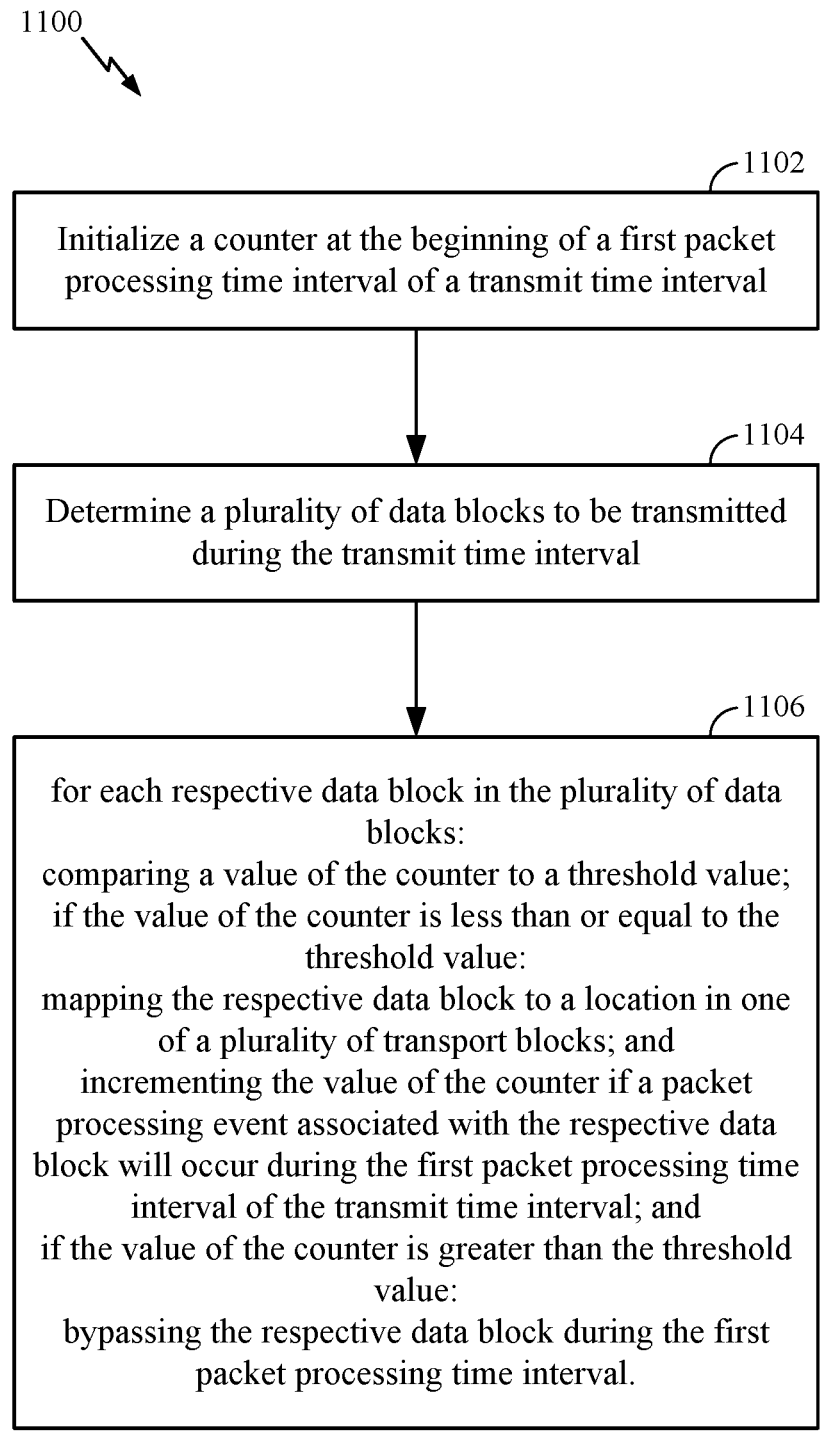
FIG. 11 depicts aspects of another method for preparing data for transmission from a user equipment in a wireless communication system.

FIG. 11 depicts aspects of another method 1100 for preparing data for transmission from a user equipment in a wireless communication system. For example, the method 1100 may be performed by a packet mapping function of a user equipment.

The method 1100 begins at step 1102, where a counter is initialized at the beginning of a first packet processing time interval of a transmit time interval, such as a packet processing time intervals (PPTI) and transmit time intervals (TTI) shown in FIGS. 8A-8B and 9.

The method 1100 proceeds to step 1104 where a plurality of data blocks are determined to be transmitted during the transmit time interval. For example, the data blocks DB1-10 in FIGS. 8A and 9 and data blocks DB1-12 in FIG. 8B.

The method 1100 then proceeds to step 1106, where for each respective data block in the plurality of data blocks a value of the counter is compared to a threshold value, such as the maximum memory access starts or maximum PDUs thresholds discussed above with respect to FIGS. 8A-8B and 9. If the value of the counter is less than or equal to the threshold value, then the respective data block is mapped to a location in one of a plurality of transport blocks, and the value of the counter is incremented if a packet processing event associated with the respective data block will occur during the first packet processing time interval of the transmit time interval. If the value of the counter is greater than the threshold value: then the respective data block is bypassed during the first packet processing time interval. In other words, the respective data block is not mapped to a transport block during the first packet processing time interval.

Though not shown in FIG. 11, in some embodiments of method 1100, if the value of the counter is greater than the threshold value, then the respective data block is mapped to a location in one of the plurality of transport blocks such that a packet processing event associated with the respective data block will not occur until a second packet processing time interval of the transmit time interval.

Figure 12:
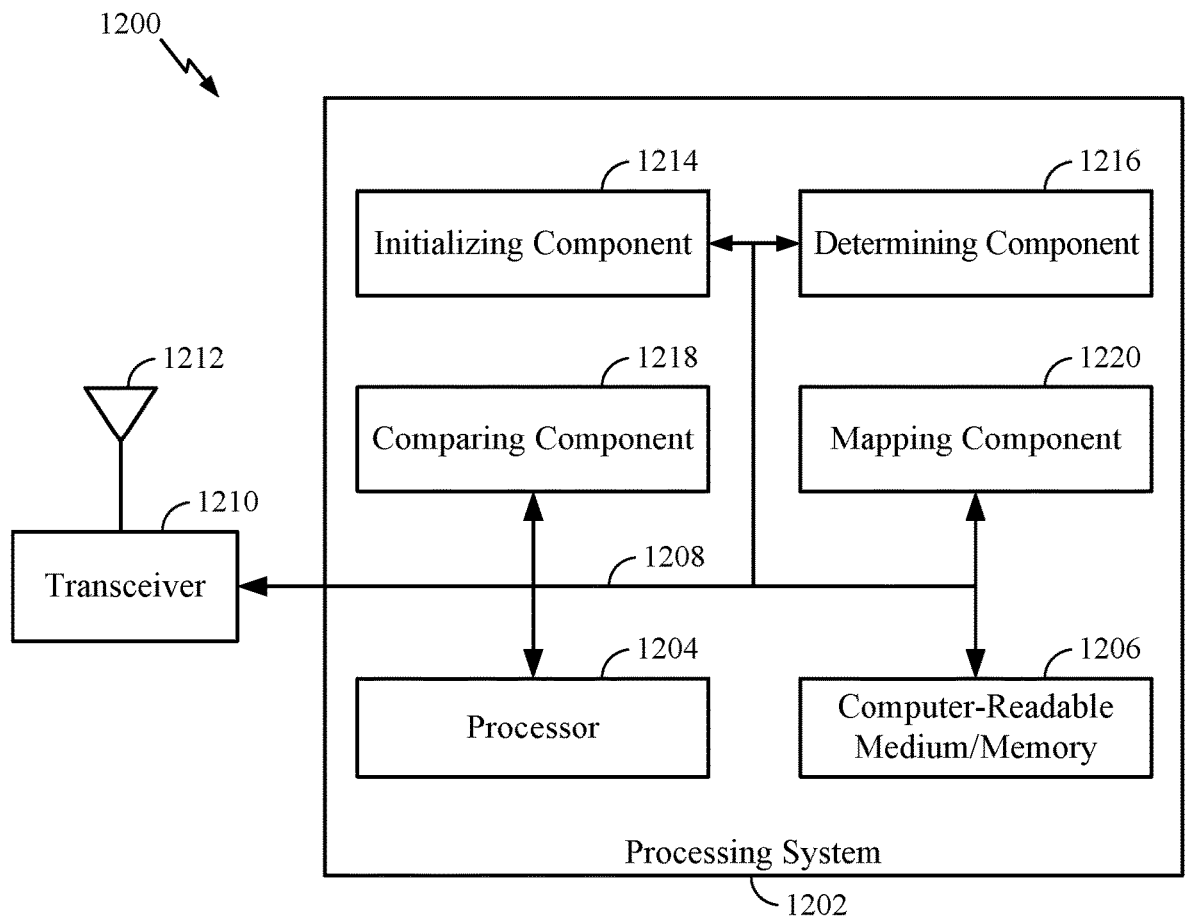
FIG. 12 depicts a communications device that may include various components configured to perform operations for the techniques disclosed herein in accordance with aspects of the present disclosure.

FIG. 12 depicts a communications device 1200 that may include various components (e.g., corresponding to means-plus-function components) configured to perform operations for the techniques disclosed herein, such as the operations illustrated in FIGS. 8A-8B, 9, 10, and 11. The communications device 1200 includes a processing system 1202 coupled to a transceiver 1210. The transceiver 1210 is configured to transmit and receive signals for the communications device 1200 via an antenna 1212, such as the various signals described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1206 via a bus 1208. In certain aspects, the computer-readable medium/memory 1206 is configured to store computer-executable instructions that when executed by processor 1204, cause the processor 1204 to perform the operations illustrated in FIGS. 8A-8B, 9, 10, and 11, or other operations for performing the various techniques discussed herein.

In certain aspects, the processing system 1202 further includes an initializing component 1214 for performing the operations illustrated in FIGS. 8A-8B, 9, 10, and 11. Additionally, the processing system 1202 includes a determining component 1216 for performing the operations illustrated in FIGS. 8A-8B, 9, 10, and 11. Additionally, the processing system 1202 includes a comparing component 1218 for performing the operations illustrated in FIGS. 8A-8B, 9, 10, and 11. Additionally, the processing system 1202 includes a determining component 1220 for performing the operations illustrated in FIGS. 8A-8B, 9, 10, and 11. The initializing 1214, determining 1216, comparing 1218, and mapping 1220 components may be coupled to the processor 1204 via bus 1208. In certain aspects, the initializing 1214, determining 1216, comparing 1218, and mapping 1220 components may be hardware circuits. In certain aspects, the initializing 1214, determining 1216, comparing 1218, and mapping 1220 components may be software components that are executed and run on processor 1204.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8A-8B, 9, 10, and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of preparing data for wireless transmission from a user equipment, comprising:
    initializing a memory access counter at a beginning of a first packet processing time interval of a wireless transmit time interval;
    determining a plurality of data blocks to be transmitted during the wireless transmit time interval;
    for each respective data block in the plurality of data blocks:
        comparing a value of the memory access counter to a threshold value;
        if the value of the memory access counter is less than or equal to the threshold value:
            mapping the respective data block to a location in one of a plurality of wireless uplink transport blocks; and
            incrementing the value of the memory access counter if a packet processing event associated with the respective data block will occur during the first packet processing time interval of the wireless transmit time interval; and
        if the value of the memory access counter is greater than the threshold value:
            bypassing the respective data block during the first packet processing time interval; and
    transmitting a plurality of mapped data blocks during the wireless transmit time interval.

2. The method of claim 1, wherein:
    for each respective data block in the plurality of data blocks:
        if the value of the memory access counter is greater than the threshold value:
            mapping the respective data block to a location in one of the plurality of wireless uplink transport blocks such that a packet processing event associated with the respective data block will not occur until a second packet processing time interval of the wireless transmit time interval.

3. The method of claim 1, wherein the packet processing event comprises an insertion of a Packet Data Convergence Protocol PDU.

4. The method of claim 2, further comprising:
    if the value of the memory access counter is greater than the threshold value:
        mapping padding to one or more of the plurality of wireless uplink transport blocks.

5. The method of claim 2, further comprising:
    if the value of the memory access counter is greater than the threshold value:
        mapping at least a portion of a previously mapped data block to one or more of the plurality of wireless uplink transport blocks.

6. The method of claim 1, further comprising: fetching one or more data blocks of the plurality of data blocks from a first memory in the user equipment during a first memory access time interval.

7. The method of claim 1, further comprising: adding one or more data blocks of the plurality of data blocks to a medium access control protocol data unit for transmission from the user equipment during the wireless transmit time interval.

8. The method of claim 6, further comprising: storing at least a portion of the one or more data blocks fetched from the first memory in a second memory during the wireless transmit time interval.

9. The method of claim 5, wherein the at least a portion of a previously mapped data block comprises a packet data convergence protocol service data unit.

10. The method of claim 5, wherein the at least a portion of a previously mapped data block comprises a radio link control protocol data unit.

11. The method of claim 5, wherein the at least a portion of a previously mapped data block comprises a media access control protocol data unit.

12. The method of claim 5, wherein the at least a portion of a previously mapped data block comprises data from an invalid or reserved logical channel.

13. The method of claim 4, wherein mapping padding to one or more of the plurality of wireless uplink transport blocks further comprises: mapping the padding according to a padding length indicator.

14. A user equipment for wireless communication, comprising:
    at least one processor; and
    a first memory coupled to the at least one processor, the first memory including instructions executable by the at least one processor to cause the user equipment to:
        initialize a memory access counter at a beginning of a first packet processing time interval of a wireless transmit time interval;
        determine a plurality of data blocks to be transmitted during the wireless transmit time interval;
        for each respective data block in the plurality of data blocks:
            compare a value of the memory access counter to a threshold value;
            if the value of the memory access counter is less than or equal to the threshold value:
                map the respective data block to a location in one of a plurality of wireless uplink transport blocks; and
                increment the value of the memory access counter if a packet processing event associated with the respective data block will occur during the first packet processing time interval of the wireless transmit time interval; and
            if the value of the memory access counter is greater than the threshold value:
                bypass the respective data block during the first packet processing time interval; and
        transmit a plurality of mapped data blocks during the wireless transmit time interval.

15. The user equipment of claim 14, wherein the first memory further includes instructions executable by the at least one processor to cause the user equipment to:
    for each respective data block in the plurality of data blocks:
        if the value of the memory access counter is greater than the threshold value:
            map the respective data block to a location in one of the plurality of wireless uplink transport blocks such that a packet processing event associated with the respective data block will not occur until a second packet processing time interval of the wireless transmit time interval.

16. The user equipment of claim 15, wherein the packet processing event comprises an insertion of a Packet Data Convergence Protocol PDU.

17. The user equipment of claim 15, wherein the first memory further includes instructions executable by the at least one processor to cause the user equipment to:
    if the value of the memory access counter is greater than the threshold value:
        map padding to one or more of the plurality of wireless uplink transport blocks.

18. The user equipment of claim 14, wherein the first memory further includes instructions executable by the at least one processor to cause the user equipment to:
    if the value of the memory access counter is greater than the threshold value:
        map at least a portion of a previously mapped data block to one or more of the plurality of wireless uplink transport blocks.

19. The user equipment of claim 14, wherein the first memory further includes instructions executable by the at least one processor to cause the user equipment to: fetch one or more data blocks of the plurality of data blocks from a second memory in the user equipment during a first memory access time interval.

20. The user equipment of claim 14, wherein the first memory further includes instructions executable by the at least one processor to cause the user equipment to: add one or more data blocks of the plurality of data blocks to a medium access control protocol data unit for transmission from the user equipment during the wireless transmit time interval.

21. The user equipment of claim 19, wherein the first memory further includes instructions executable by the at least one processor to cause the user equipment to: store at least a portion of the one or more data blocks fetched from the second memory in a third memory during the wireless transmit time interval.

22. The user equipment of claim 18, wherein the at least a portion of a previously mapped data block comprises a packet data convergence protocol service data unit.

23. The user equipment of claim 18, wherein the at least a portion of a previously mapped data block comprises a radio link control protocol data unit.

24. The user equipment of claim 18, wherein the at least a portion of a previously mapped data block comprises a media access control protocol data unit.

25. The user equipment of claim 18, wherein the at least a portion of a previously mapped data block comprises data from an invalid or reserved logical channel.

26. The user equipment of claim 17, wherein mapping padding to one or more of the plurality of wireless uplink transport blocks further comprises: mapping the padding according to a padding length indicator.

27. A non-transitory computer-readable medium having stored thereon instructions that when executed by a user equipment, cause the user equipment to perform a method, the method comprising:
    initializing a memory access counter at a beginning of a first packet processing time interval of a wireless transmit time interval;
    determining a plurality of data blocks to be transmitted during the wireless transmit time interval;
    for each respective data block in the plurality of data blocks:
        comparing a value of the memory access counter to a threshold value;
        if the value of the memory access counter is less than or equal to the threshold value:
            mapping the respective data block to a location in one of a plurality of wireless uplink transport blocks; and
            incrementing the value of the memory access counter if a packet processing event associated with the respective data block will occur during the first packet processing time interval of the wireless transmit time interval; and
        if the value of the memory access counter is greater than the threshold value:
            bypassing the respective data block during the first packet processing time interval; and
    transmitting a plurality of mapped data blocks during the wireless transmit time interval.

28. The non-transitory computer-readable medium of claim 27, wherein:

for each respective data block in the plurality of data blocks:
  if the value of the memory access counter is greater than the threshold value:
    mapping the respective data block to a location in one of the plurality of wireless uplink transport blocks such that a packet processing event associated with the respective data block will not occur until a second packet processing time interval of the wireless transmit time interval.

29. The non-transitory computer-readable medium of claim 27, wherein the packet processing event comprises an insertion of a Packet Data Convergence Protocol PDU.

30. The non-transitory computer-readable medium of claim 28, wherein the method further comprises:
  if the value of the memory access counter is greater than the threshold value:
    mapping padding to one or more of the plurality of wireless uplink transport blocks.

31. The non-transitory computer-readable medium of claim 28, wherein the method further comprises:
  if the value of the memory access counter is greater than the threshold value:
    mapping at least a portion of a previously mapped data block to one or more of the plurality of wireless uplink transport blocks.

32. The non-transitory computer-readable medium of claim 27, wherein the method further comprises: fetching one or more data blocks of the plurality of data blocks from a first memory in the user equipment during a first memory access time interval.

33. The non-transitory computer-readable medium of claim 27, wherein the method further comprises: adding one or more data blocks of the plurality of data blocks to a medium access control protocol data unit for transmission from the user equipment during the wireless transmit time interval.

34. The non-transitory computer-readable medium of claim 32, wherein the method further comprises: storing at least a portion of the one or more data blocks fetched from the first memory in a second memory during the wireless transmit time interval.

35. The non-transitory computer-readable medium of claim 31, wherein the at least a portion of a previously mapped data block comprises a packet data convergence protocol service data unit.

36. The non-transitory computer-readable medium of claim 31, wherein the at least a portion of a previously mapped data block comprises a radio link control protocol data unit.

37. The non-transitory computer-readable medium of claim 31, wherein the at least a portion of a previously mapped data block comprises a media access control protocol data unit.

38. The non-transitory computer-readable medium of claim 31, wherein the at least a portion of a previously mapped data block comprises data from an invalid or reserved logical channel.

39. The non-transitory computer-readable medium of claim 30, wherein mapping padding to one or more of the plurality of wireless uplink transport blocks further comprises: mapping the padding according to a padding length indicator.

40. A user equipment for wireless communication, comprising:
  means for initializing a memory access counter at a beginning of a first packet processing time interval of a wireless transmit time interval;
  means for determining a plurality of data blocks to be transmitted during the wireless transmit time interval;
  for each respective data block in the plurality of data blocks:
    means for comparing a value of the memory access counter to a threshold value;
    if the value of the memory access counter is less than or equal to the threshold value:
      means for mapping the respective data block to a location in one of a plurality of wireless uplink transport blocks; and
      means for incrementing the value of the memory access counter if a packet processing event associated with the respective data block will occur during the first packet processing time interval of the wireless transmit time interval; and
    if the value of the memory access counter is greater than the threshold value:
      means for bypassing the respective data block during the first packet processing time interval; and
  means for transmitting a plurality of mapped data blocks during the wireless transmit time interval.

* * * * *